United States Patent Office 3,513,046
Patented May 19, 1970

3,513,046
MANUFACTURE OF DOUBLE-BACKED TUFTED CARPETS
Donald Westfield, Sarnia, Ontario, Canada, assignor to Polymer Corporation Limited, Sarnia, Ontario, Canada, a body corporate
No Drawing. Filed June 30, 1967, Ser. No. 650,241
Claims priority, application Canada, Aug. 9, 1966, 967,437
Int. Cl. D05c 15/04
U.S. Cl. 156—72                                                7 Claims

ABSTRACT OF THE DISCLOSURE

In the manufacture of double-backed tufted carpets, anchoring of the tufts and adherence of the scrim backing material to the base are accomplished by applying a layer of foamed latex compound to the underside of the base and pressing the scrim backing onto the foamed layer and against the base so as to destroy the foam structure.

---

This invention relates to the manufacture of double-backed tufted carpets.

Tufted carpets are generally made by looping pile fibres through an inexpensive woven textile base, known as the primary jute, so called because it usually comprises open weave jute. The pile fibres are commonly attractively coloured natural or synthetic fibres, such as wool, cellulose acetate, polyacrylonitrile, polypropylene and the like, and mixtures of such fibres. Long pile fibres are looped through the open weave of the primary jute, one single continuous length of fibre constituting a complete row of pile in the carpet. The pile fibres are pulled tightly against one face (the underside) of the primary jute, but are left as elongated loops extending from the other face (the topside) of the primary jute, which loops constitute the tufts of the carpet. It is clear that some additional anchorage of the pile fibres must be provided, if the tufts are not to become pulled out and disarranged.

Such additional anchorage is provided by applying a rubber latex adhesive in liquid form to the underside of the carpet comprising the primary jute with the pile fibres looped therethrough. To complete the double-backed carpet, a further backing layer of material known as the scrim is applied to the latex coated underside of the carpet. The scrim is usually a further layer of open-weave jute, similar to the primary jute. The scrim serves to improve the dimensional stability and appearance of the carpet. The latex adhesive then serves not only to anchor the pile fibres, or tufts, but also to adhere the scrim to the carpet. The resulting laminate comprising a primary jute having tufts woven therethrough, an adhesive and a scrim, is a double-backed carpet.

In the usual process for making double-backed tufted carpets, the latex compound, which preferably comprises a carboxylated rubber latex, is applied in liquid form to the underside of the carpet, by means of a lick-roller or similar applicator, the scrim is applied to this underside whilst the latex is still wet, and the carpet is then passed through an oven to dry and cure the latex. However, to obtain satisfactory anchorage of the tufts, as well as satisfactory adhesion of the scrim backing, it is necessary to use fairly large amounts of latex, i.e. an amount of latex containing at least 22 ounces of dry solids in the latex compound per square yard of the carpet, and generally 25 to 28 ounces per square yard.

The object of the present invention is to reduce the amount of latex compound required for preparing double-backed tufted carpets.

In this specification and the appended claims, the term "latex compound" is to be understood to mean an aqueous latex of a rubbery polymer containing at least 50 weight percent of total solids prior to being compoounded, and being compounded by blending therewith one or more latex compounding ingredients, i.e. thickener, fillers, curatives, antioxidants, tackifiers, etc.

It has now been found that the amount of latex compound necessary for producing double-backed carpets having satisfactory anchorage or tufts and satisfactory adhesion of the scrim backing can be reduced by a process which includes the steps of foaming the latex compound prior to its application to the carpet, bringing the scrim backing into contact with the carpet so as to destroy substantially all of the foam structure and drying the assembly with the scrim backing in contact with the carpet. It has been found that the increase of volume of the latex compound due to the foaming allows reduction of the weight of this compound to be applied while maintaining an adequate bond between the carpet and the secondary backing material.

Thus a characteristic feature of the process of the invention consists of the use of a latex compound which is foamed but which does not contain the usual foaming ingredients necessary to maintain a stable foam structure in the final product, as explained hereinafter. The exact weight reduction of the latex compound depends mainly on the degree of foaming, but good adhesion is reached with less than 20 ounces. Good results have been obtained with 6 to 18 ounces of dry solids in a latex compound per square yard of tufted carpet. In this process, lower amounts are preferably used with unloaded latex compounds, i.e. those which do not contain inert fillers, particularly between 6 and 11 ounces per square yard. The higher amounts are used with latex compounds loaded with fillers and more particularly between 11 and 18 ounces of dry solids in the latex compound per square yard of tufted carpet.

As it is not necessary that the latex should be kept in its cellular, foamed form after the scrim has been contacted with the foam coated surface of the carpet, the addition of the scrim to the carpet may be completed by applying pressure to the laminate so formed. This is conveniently accomplished by passing the laminate through nip-rollers, such as are used on conventional carpet backing machines. The process thus has an added advantage that it can be carried out using the conventional carpet backing equipment modified at most only in minor respects.

In addition to the substantial advantage of using less latex than the process using liquid latex compounds, the process of the invention has two other advantages. Firstly, the lower amount of latex used means that less water is applied to the carpet in the latex, so that the latex can be subsequently dried more easily. Secondly, latices of very high total solids content can be used which require only small amounts of thickener and which have faster drying rates.

The latex to be used may be a latex of any rubber, including natural rubber, synthetic rubber such as SBR, including high styrene content styrene-butadiene copolymer, NBR, etc. The preferred latices are however, carboxylated SBR latices, since these are self-curing and do not require any vulcanizing ingredients.

It should be noted that in the present invention it is not necessary to add to the latex to be foamed, setting, gelling or sensitizing agents, or foam stabilizers such as zinc oxide, ammonium salts, fluosilicates, polyamines, etc., since a permanent foam structure in the finished article is not required.

As previously noted a carboxylated SBR latex is preferably used, to which is added a suitable antioxidant. This latex may be compounded with from 0 to about 400 parts by weight of fillers per hundred parts by weight of dry rubber. This is suitably accomplished by mixing the filler directly into the latex and adding extra water if necessary. This latex compound is then thickened preferably by adding a thickener of the polyacrylate type; the extent to which the latex is thickened depends upon the degree of foaming which the latex will undergo and the preferred application viscosity. It is sometimes useful to add at the same time a small amount of soap, such as potassium oleate or ammonium oleate up to a level of about 0.5 part by weight of dry latex, to facilitate foaming.

The foaming of the latex compound may be accomplished by any suitable process known in the art, examples of which are air whisking, i.e. whipping air into it, and the use of chemical foaming agents. The foam may be made, for instance, in a foaming head, whisk, beater or in any other suitable apparatus. The foaming degree is generally between 1.1 and 7 times and preferably 1.5 and 4 times the original volume of the latex compound. These ranges are not to be construed as limitations, and may be exceeded if desired.

The foamed compound is then applied on to the back of the carpet by any suitable means such as by spreading with a doctor blade, or by spraying such as with a point gun. The preferred method of application is by means of a lick-roller, the use of which is common in conventional carpet backing processes.

The underside of the carpet thus coated with the wet foam compound is then brought into contact with the scrim, which may be a woven or a non-woven fabric, paper, polypropylene or most commonly open weave jute, by any suitable means. It should be noted that it is not necessary to preheat the wet foam before applying the scrim, as the foam structure is not to be retained in the final product. For the same reason, the means used to bring into contact the scrim and the foam coated underside of the carpet does not need special provisions as in the case where the foam layer is to be retained, and so nip rollers or any other suitable calendering means can be used.

The laminate of carpet and scrim is then dried in an oven, which also effects cure of the latex as in conventional carpet backing operations. The final product has substantially no foam layer, the foam structure having been destroyed on application of the scrim backing or during the heating step.

The following examples, in which all parts are by weight, will illustrate specific embodiments of the process according to the invention.

EXAMPLE 1

190 parts of a carboxylated styrene-butadiene copolymer latex having a bound styrene content of 58% and a solids content of 53%, and available commercially under the trade name "Polysar Latex 774," were mixed with 250 parts of "Pulpro Whiting" (trademark for a finely ground natural calcium carbonate) and 7 parts of 14% sodium polyacrylate as thickener.

The above latex compound was foamed by means of a mechanical whisk to twice its original volume. The thus foamed compound was spread by means of a pallet knife onto a looped pile carpet consisting of cellulose acetate pile fibres looped through a primary jute, at a weight corresponding to 15 ounces of dry solids per square yard. The scrim of woven jute (8 ounces per square yard grade) was then brought into contact with the wet foamed compound on the underside of the carpet, and the laminate so formed was pressed together lightly by means of rollers.

The double-backed carpet so formed was then dried in an oven at 135° C.

The resulting bond between carpet and scrim was tested by means of a Scott tester. A strip of the laminate was prepared and the carpet and scrim were gripped separately, one in each jaw of the Scott tester. The carpet and scrim were pulled apart by the tester and the bond between them was found to be 5 pounds per 2-inch width of sample, which is well within the acceptable range of bond strengths for such carpets.

Similar results were obtained with a tufted carpet having acrylic pile fibres.

EXAMPLE 2

A latex compound was prepared with the same ingredients and under the same conditions as in Example 1, except that a carboxylated styrene-butadiene latex having a bound styrene content of 63% and a solids content of 53% was used. The latex was used to prepare two double-backed tufted carpets, one having cellulose acetate pile fibres and the other having acrylic pile fibres, both carpets having a jute scrim. The foamed latex was applied to the carpets in the manner described in Example 1 at a weight corresponding to 15 ounces of dry solids per square yard. In each case the bond strength was tested as previously described and in each case was found to be 7 pounds per 2-inch width.

EXAMPLE 3

The same latex compound as in Example 2 was prepared except that no filler was used, and only 5 parts of polyacrylate thickener were added. This latex compound was then foamed to approximately 2.5 times its original volume and applied at a weight of 9.5 ounces of dry solids per square yard of a tufted carpet having acrylic pile fibres.

The resulting bond between carpet and jute scrim was found to be between 15 and 20 pounds per 2-inch strip.

What is claimed is:

1. In a process for preparing double-backed tufted carpets in which pile fibres are looped through a woven textile base, and comprising the application of a latex compound to the underside of the carpet in order to anchor the pile fibres to the textile base and applying a scrim to the latex coated underside of the carpet, the improvement consisting of the application of the latex compound in foamed form in amount of about 6 to 18 ounces dry weight basis per square yard of carpet to the underside of the carpet, and of contacting the scrim with the foam covered underside of the carpet so as to destroy substantially all of the foam structure.

2. The process of claim 1 wherein the latex compound contains up to 400 parts by weight of inert fillers per hundred parts by weight of dry polymer, and the foamed latex compound is applied to the carpet in an amount of from about 11 to about 18 ounces of dry solids.

3. The process of claim 1 wherein the latex compound contains a polymer latex as the main compound by weight of said latex compound, and the foam latex compound is applied to the carpet in an amount of from about 6 to about 11 ounces of dry solids per square yard of carpet.

4. The process of claim 1 in which the latex compound is foamed to a degree of between about 1.1 and about 7.0 times the original volume of the latex compound.

5. The process of claim 1 in which the latex compound comprises a carboxylated styrene-butadiene copolymer.

6. The process of claim 2 in which the latex compound comprises a carboxylated styrene-butadiene copolymer and is foamed to a degree of between about 1.1 and 7.0 times the original volume of the latter compound.

7. The process of claim 3 in which the latex compound comprises a carboxylated styrene-butadiene copolymer and is foamed to a degree of between about 1.1 and about 7.0 times the original volume of the latex compound.

(References on following page)

References Cited

UNITED STATES PATENTS

| | | | |
|---|---|---|---|
| 3,007,836 | 11/1961 | McNamara et al. | 156—310 |
| 3,309,259 | 3/1967 | Schwartz et al. | 161—67 |
| 3,383,243 | 5/1968 | DiGioia | 161—66 XR |
| 3,414,458 | 12/1968 | Lacy | 161—66 XR |

ROBERT F. BURNETT, Primary Examiner

R. H. CRISS, Assistant Examiner

U.S. Cl. X.R.

156—78, 155; 161—66, 67